United States Patent [19]

Miller

[11] 3,709,361

[45] Jan. 9, 1973

[54] DEVICE FOR SEPARATING LIVING CELLS

[75] Inventor: Richard G. Miller, Toronto, Ontario, Canada

[73] Assignee: Ontario Cancer Institute, Toronto, Canada

[22] Filed: May 26, 1970

[21] Appl. No.: 40,542

[52] U.S. Cl. .....................210/83, 210/94, 210/511, 210/532
[51] Int. Cl. .............................................B01d 21/02
[58] Field of Search.......210/65, 83, 71, 511, 94, 532

[56] References Cited

UNITED STATES PATENTS

| | | | |
|---|---|---|---|
| 2,790,560 | 4/1957 | Beyland | 210/94 X |
| 3,215,275 | 11/1965 | Bastecky et al. | 210/71 X |
| 3,556,502 | 1/1971 | Rheinlander et al. | 210/83 |

Primary Examiner—John Adee
Attorney—Stevens, Davis, Miller & Mosher

[57] ABSTRACT

The present invention relates to an apparatus for use in the separation of living cells by velocity sedimentation under unit gravity which apparatus comprises a frame, a closed vessel mounted in said frame about a horizontal axis for rotation between a sedimentation position and a loading and unloading position, said vessel having opening means adjacent the bottom wall thereof and opening means adjacent the top wall thereof for the introduction and removal of liquids to and from said vessel, said vessel being shaped and dimensioned such that contours of equal density in a liquid medium substantially filling said vessel extend between the side walls of said vessel when said vessel is in the sedimentation position and between the side walls and the top wall of said vessel when said vessel is in the loading and unloading position. The present invention also relates to a method of separating living cells in a sample using said apparatus.

16 Claims, 6 Drawing Figures

PATENTED JAN 9 1973 3,709,361
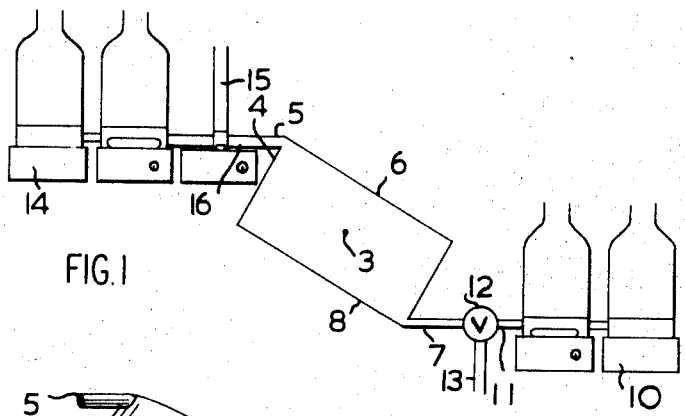
FIG.1
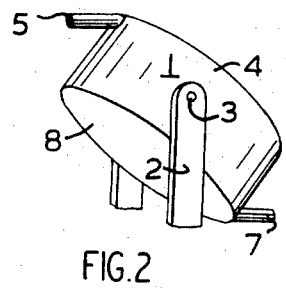
FIG.2
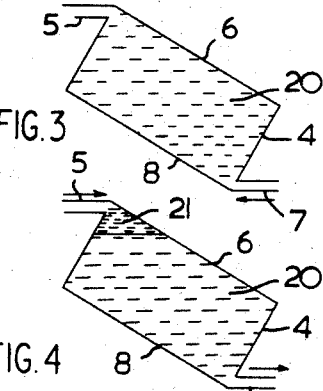
FIG.3
FIG.4
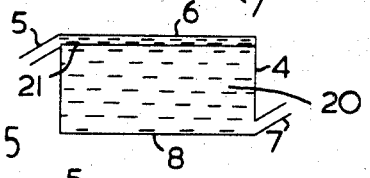
FIG.5
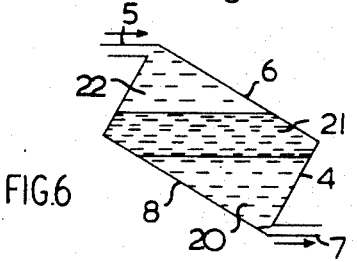
FIG.6

DEVICE FOR SEPARATING LIVING CELLS

The present invention relates to the fractionation of a suspension of living cells into different sub-populations, in particular mammalian cells such as bone marrow cells, blood cells and spleen cells. In particular the present invention relates to an improved process for the separation of such living cells from a sample thereof, i.e. the fractionation of populations of living cells based primarily on the size of the cells and essentially independent of their shape, by velocity sedimentation in the earth's gravitational field i.e. under unit gravity (1 g.). The present invention also relates to a novel apparatus for use in such improved velocity process.

The ability to fractionate a complex population of cells into subpopulations differing in one or more physical characteristics and still capable of normal function is a very powerful tool for the study of many problems in cellular biology, particularly in the field of differentiation, and may also have application in clinical medine. For example such a technique can be used either preparatively to obtain a purified sub-population of cells to be used for further experimentation or analytically to study the properties of the particular sub-population of cells under varying conditions.

Numerous techniques for separating cells have been tested and one widely used method is density gradient centrifugation in which cells are spun to their equilibrium positions in a gradient of bovine serum albumen. Unfortunately various differentiated cells do not vary greatly in density and significant separations are seldom achieved in using this technique. In addition a major problem with density gradient centrifugation is that of reproducibility. Very small changes in pH or salt concentration can completely change the buoyant densities found for different cell types.

Microscopic examination of most cell populations shows that different cell types vary greatly in size and that cell size is often correlated with cell function. Thus a technique producing fractionation on the basis of cell size will also produce fractionation of functionally different cells which is as aforesaid highly desirable.

The sedimentation velocity of a spherical cell falling through a liquid under gravity is given by the equation $$s = \frac{2(p-p')}{9\mu} gr^2$$

where $\mu$ is the coefficient of viscosity, $p$ and $p'$ the densities of the cell and the liquid respectively, $g$ the acceleration due to gravity and $r$ the radius of the cell. Thus techniques have been developed using the differences in sedimentation rate to separate cells on the basis of cell size. One such system is the Staflo system such as set forth, for example, in an article entilted "Sedimentation Properties of Nucleated and Non Nucleated Cells in Normal Rat Bone Marrow" by H. C. Mel, in Nature 200, pages 423 to 425. However such a system is not too successful largely because of problems associated with wall effects and with the continuous collection of cells from the sedimentation chamber.

A more recent system for separating living cells using sedimentation velocity is one in which a thin band of the cells in a liquid layer at the top of a liquid gradient filled chamber falls through the liquid gradient under gravity. In this process, despite the presence of a very shallow density gradient which is required to prevent mixing of adjacent layers of the liquid gradient and the fact that different cell types do differ slightly in density, the sedimentation velocity depends primarily upon the $r^2$ term in the aforesaid equation. Thus cell separation takes place primarily on the basis of size. This system is set forth in an article entitled "Separation of Cells by Velocity Sedimentation" by Richard G. Miller and R. A. Phillip in the Journal of Cellular Physiology, Volume 73, No. 3, June, 1969, and with slight modification in an article entitled "Separation of Bone Marrow Cells by Sedimentation at Unit Gravity" by E.A. Peterson and W.H. Evans, 1967, Nature 214, pages 824 and 825. As set forth in the article of Miller et al. the velocity sedimentation apparatus has three main parts, namely a sedimentation chamber, a gradient maker and a small intermediate vessel for the cell sample and buffer gradient. The sedimentation chamber is a transparent cylindrical cavity with a conical base with a cone angle at 30° to the horizontal cut from a cylindrical block of lucite. A three way valve is located at the base of the chamber connecting the chamber to inlet and drain tubes and flow regulators are provided in both the inlet and drain tubes. The chamber is both fill and drained through a hole in the base by means of said tubes. In a typical operation a 20 ml sample of washed cells in 3 or 5 percent fetal calf serum (F. C. S.) in phosphate buffered saline solution (P. B. S.) is introduced from the intermediate vessel into the chamber under a 30 ml layer of phosphate buffered saline solution. The top layer of phosphate buffered saline solution prevents disturbance of the cell by erratic movements of the rising fluid meniscus as the chamber is filling. A linear 15 to 30 percent or non linear 5 to 30 percent fetal calf serum in phosphate buffered saline solution gradient of total volume about 500 mls is introduced under the cell band from the gradient maker and a small stainless steel baffle is used to disperse the incoming jets of liquid which would otherwise produce mixing. The entire filling operation takes from 15 to 45 minutes depending upon the shape of the gradient used and after 2 to 4 hours the chamber is drained. The liquid in the cone is discarded and the remainder of the gradient is collected in 15 ml fractions in disposable plastic tubes as separated cells.

The sole function of the gradient in the liquid is to prevent convection and mixing of adjacent layers during the separation process. Even at the highest concentration of 30 percent fetal calf serum, which is the gradient producing compound, the actual protein concentration is only about 2 percent and at room temperature the change in density over the range 0 to 30 percent fetal calf serum in the phosphate buffered saline solution is from about 1.004 gms/cm$^3$ to 1.009 gm/cm$^3$. Nucleated cells typically have a density of about 1.06 gms/cm$^3$ and thus the presence of the gradient has little effect upon the sedimentation rate of the cells. Instead of fetal calf serum, bovine serum albumen (B. S. A.) in gradients ranging from 0.5 to 2.0 percent or sucrose polymer in a gradient of 0.5 to 3 percent may be used to achieve similar densities.

It is critical that the liquid medium providing the gradient maintain cell viability as the cells remain in it for substantial periods of time sometimes ranging from 12 to 24 hours, and as such, the liquid medium forming the gradient is isotonic saline solution and preferably is a buffered saline solution such as Dulbecco's phosphate buffered saline. The gradient producing material must be one which is capable of altering the density of the liquid without significantly altering the osmotic pressure and should be of high molecular weight such as the protein material contained in fetal calf serum or an albumen such as bovine albumen serum or a sucrose polymer such as Ficall. Further cell viability is improved by working in a cold room at about 4° C. which has the additional advantage of severely inhibiting all cellular metabolism during the separation process. Thus with the aforesaid liquid media there was not detectable loss in cell viability.

The most important single parameter in determining the success of the separation of the cells is the concentration of cells in the starting band and a phenomenon called "streaming" occurs above a certain critical cell concentration in the cell sample called the "streaming limit." In this phenomenon the cell band takes the appearance of an upside down grass lawn with individual streamers rapidly obtaining a length of 1 centimeter or more. Streaming is undesirable as it effectively inhibits separation of the cells based upon their size. The exact value of the streaming limit depends both on the kind of cells in the cell band and the shape of the gradients supporting the cell bands. Thus it is found with a liquid medium having a shear step gradient, i.e., a linear gradient of 15 to 30 percent fetal calf serum in a phosphate buffered saline solution, that the maximum concentration of the cells in the sample being separated i.e., in the cell band for streaming to occur is much lower than the maximum concentration using a liquid medium having a buffered step gradient i.e., a liquid medium in which the concentration of fetal calf serum in the phosphate buffered saline solution rises steeply from 5 to 15 percent calf serum immediately beneath the band of the cell sample and then more slowly rises from 15 to 30 percent fetal calf serum.

Further the liquid medium in which the cells are suspended in the sample must also not significantly lower the viability of the cells and must have an appropriate density. The sample suitably comprises the washed cells in a phosphate buffered saline solution containing the gradient producing compound, e.g., fetal calf serum suitably in an amount of 3 or 5 percent.

However, in the aforesaid process the liquid sample of the living cells is introduced first into the conical bottom of the sedimentation chamber and the sample is subsequently raised by the liquid radiant medium which is then introduced into the bottom of the chamber from the gradient maker and the process inherently has disadvantages which detract from the efficacy of the process in separating living cells. In particular the cell sample on being introduced first into the bottom of the sedimentation chamber contacts the conical walls of that chamber and the cells in contact with the conical walls of the chamber tend to stick to the bottom of the chamber when the sample is subsequently raised in the chamber by the liquid gradient. Again with many cell samples some of the larger cells therein have a high sedimentation velocity and during the raising of the cell sample by the liquid gradient medium which may take from 15 to 45 minutes, they may fall completely through this liquid gradient medium and contact the conical walls of the sedimentation vessel which also detracts from the efficacy of the process in effecting good separation of the cells. Again in the aforesaid process it is found that despite efforts to prevent it through use of a flow baffle, there is sometimes mixing of the sample layer as it is with the fluid above and below it, and again this reduces the efficacy of the separation process.

The present invention provides an improved process and apparatus for the separation of living cells from a sample thereof in which the aforesaid disadvantages are substantially reduced. In addition, reproducible separations are more easily achieved.

It has now been found that by effecting the separation in a closed vessel in which the liquid gradient medium is introduced into the bottom of the vessel to substantially completely fill the vessel and the cell sample is subsequently introduced from the top of the vessel and further by initially having the vessel in a tilted position for loading of the vessel and subsequently for unloading of the vessel such that the area of the surface of the liquid gradient medium during the charging and discharging of the vessel is substantially less than the cross-sectional area of the liquid surface when the vessel is in a non-tilted normally upright sedimentation position into which it is rotated for sedimentation then the aforesaid disadvantages inherently do not occur and it is found that the sample flows evenly over the whole surface of the liquid gradient medium to form a uniform cell layer when the vessel is rotated from its loading and unloading position to the sedimentation position.

According to the present invention therefore, there is provided apparatus for use in the separation of living cells by velocity sedimentation under unit gravity, which apparatus comprises a frame, a closed vessel mounted about a horizontal axis in said frame for rotation between a sedimentation position and a loading and unloading position, said vessel having opening means adjacent the bottom wall thereof and opening means adjacent the top wall thereof for the introduction and removal of liquids from said vessel, said vessel being shaped and dimensioned such that contours of equal density in a liquid medium substantially filling said vessel extend between the side walls of said vessel in the sedimentation position and the side wall and the top wall of said vessel in said loading and unloading position.

The present invention also provides a process for the separation of living cells by velocity sedimentation under unit gravity in a sample thereof in which said cells are suspended in an isotonic saline solution containing a high molecular weight polymer, which process comprises forming in a sedimentation vessel a layer of said sample on the upper surface of a liquid gradient medium having a maximum density less than the density of the least dense cell of said sample, a density gradient which increases with depth and comprises an isotonic saline solution including a high molecular weight polymer as gradient producing material, allowing said cells to separate primarily based on their size into layers in said liquid gradient medium and separately removing said layers from said vessel, the improvement which comprises introducing said liquid medium into the base of a closed sedimentation vessel disposed in a loading position to at least substantially fill said vessel, introducing said sample into the top of said vessel to form a layer on the surface of said liquid medium with the surface of said liquid medium in said loading position extending between the side walls of said vessel and the top wall of said vessel, rotating said vessel about a horizontal axis from said loading position to a sedimentation position in which the surface of said liquid medium extends between the side walls of said vessel allowing the cells in said sample to separate into layers in said liquid medium based primarily on their size, rotating said vessel to an unloading position in which the surface of the liquid medium extends between the side wall and the top wall of said vessel and introducing a second liquid medium into the top of said vessel while withdrawing liquid medium from the bottom of said vessel at the same rate as the introduction of said second liquid medium and subsequently collecting separated cells from different levels in said liquid medium exiting from the bottom of said vessel, said second liquid medium having a density gradient which increases with depth and comprising an isotonic saline solution including a high molecular weight polymer as gradient producing material.

It will be readily seen that the process of the present invention is essentially one of technique in effecting the separation. The composition of the liquid gradient medium and the composition of the cell sample as well as the gradients and densities of the medium and sample may be the same as those disclosed with regard to the stationary sedimentation vessel as set forth in the article of Miller et al. referred to above as well as the particular apparatus involved in preparing and metering the liquid gradient medium and the cell sample to the sedimentation vessel. Essentially the difference between the process of the present invention and the aforesaid method is in the separation vessel itself whence instead of a stationary separation vessel, the separation is effected in a closed vessel which is smoothly rotatable about a horizontal axis between a sedimentation position in which the vessel is disposed normally with the side walls being vertical and the loading and unloading position in which the vessel is tilted such that the contours of equal gradient density extend between the side walls and top wall of the vessel. For these conditions the length of the vessel is suitably substantially less than the width of the vessel. Suitably the vessel is a cylinder of generally cylindrical shape and preferably the vessel is in the form of a hollow cylinder having flat top and bottom walls and desirably, in order to dissipate any kinetic energy which the liquids entering through the opening will have and thus to avoid any undue mixing of the liquids in the vessel, the openings desirably take the form of conduits which are located at an acute angle to the side wall i.e., an obtuse angle to the top and bottom walls which walls absorb the kinetic energy of the fluid liquids. However for a similar effect the conduits may be disposed to project the liquid at an obtuse angle to the side walls. Again in order to follow the separation phenomena in the vessel the vessel is desirably transparent and is suitably made from lucite.

The apparatus of the present invention includes means for introducing the liquid gradient medium into the vessel through the opening in the base thereof and means for introducing the sample through the opening adjacent the top wall of the vessel and these may be the same gradient maker and intermediate vessel as set forth in the article by Miller et al. Thus the conduit adjacent the base of the closed vessel is connected to a conduit through which the vessel may be placed in communication with a first container means capable of forming in said vessel a liquid gradient medium having a density gradient or with a discharge outlet for the discharge of said liquid medium or discharge of separated cells, and the conduit adjacent the top of the closed vessel is connected to a conduit through which said vessel may be placed in communication with a second container means similar to the first container means capable of forming in said vessel a liquid gradient medium having a density gradient or with a source of the living cells to be separated.

In the process of the present invention the cell sample is introduced into the vessel after the introduction of the liquid medium and not before and as such there will be no sticking of the cells in the sample to the bottom of the vessel, there will be no complications due to faster sedimentation of the larger cells in the cell sample, and mixing problems which occur with the stationary sedimentation vessel are substantially reduced. Further on rotation of the vessel from the loading and unloading position to the sedimentation position due to the forces of gravity the cell sample will flow freely over the surface of the liquid medium and produce an even and uniform layer of the cell sample on the surface of the liquid medium.

To further avoid undue turbulence and mixing when the cell sample is introduced into the sedimentation vessel in a preferred embodiment of the present invention the vessel is initially completely filled with the liquid gradient medium and then the cell sample is introduced through the upper inlet while at the same time withdrawing an equal volume of liquid medium from the lower inlet to produce a siphoning effect. Further when the separation of the cell is complete in the liquid medium, in order to withdraw the cell sample from the reaction vessel the liquid medium is withdrawn from the lower outlet from the reaction vessel and at the same time a second liquid medium which is similar to the first liquid medium but which has a different density gradient is introduced through the upper opening at the same rate as the withdrawal of the first liquid medium from the lower opening thus producing a smooth flowthrough without any turbulence or mixing.

As aforsaid the sole function of the gradient in the liquid medium is to prevent convection and mixing of adjacent layers during loading and unloading of the sedimentation chamber and as such the second liquid medium for similar reasons will have a liquid gradient and further in order to maintain cell viability the second liquid medium must be an isotonic saline solution and preferably a phosphate buffered saline solution and in this respect may be similar to the first liquid medium except that the liquid medium has a different density gradient and for example may contain 0 to 5 percent fetal calf serum as the density gradient.

The high molecular weight polymer in the first liquid medium and in the second liquid medium may be any of those conventionally heretofore used such as fetal calf serum, bovine serum albumen or sucrose polymer.

Thus according to one embodiment of the present invention the first liquid gradient medium is a phosphate buffered saline solution containing as gradient producing agent, a bovine serum albumen or fetal calf serum, said medium having a maximum density of less than about 1.01 gm./cm$^3$. It is essential that the maximum density of the liquid medium should be less than the density of the least dense cell being separated as otherwise some of the cells will tend to float which will inhibit separation of the cells. As nucleated cells which are present in mammalian tissue typically have a density of about 1.06 gm/cm$^3$ the density of the liquid medium should be substantially below this at room temperature and is suitably less than 1.01 gm/cm$^3$. In particular at room temperature a phosphate buffered solution containing from 15 to 30 percent fetal calf serum has a density ranging up to 1.009 gms/cm$^3$ and this medium is highly suitable as the first liquid gradient medium. Alternatively a phosphate buffered saline solution containing from 0.5 to 2 percent bovine serum albumen will have a similar range of density suitably 1.004 to 1.006 and this medium is also suitable as the first liquid gradient medium.

The second liquid medium may be the same as the first liquid medium and suitably has a linear gradient of from 5 to 0 percent of fetal calf serum in the phosphate buffered solution.

The cell sample is suitably suspended in 10 percent fetal calf serum in phosphate buffered saline.

The time of sedimentation must be sufficient to effect a good cell separation and suitably this time is of the order of 3 ½ to 4 hours and the temperature is suitably around 4° C. for the reasons as heretofore set forth. While the gradients referred to are linear shear step gradients, non linear buffered step gradients in the first liquid medium may also be used.

The cells which may be separated according to the present invention include mammalian cells and, in particular, cells undergoing their division cycle which may be separated into populations of cells differentially enriched for any desired part of the cycle upon which studies of biochemical and physiological events can be more closely studied, the preparation effectively producing synchronized cells in any particular layer.

Synchronization is achieved because a cell which is just about to divide has approximately twice the volume of the two daughter cells produced just after division. The volume of the daughter cells increases monotonically as they advance through the cell cycle to their division point, at which time they have about the same volume as their parent. Thus, the closer a cell is to division, the faster it should sediment and the further down the gradient it should be found. The shape of the sedimentation profile, the volume of the cells in each part of it, and the number of cells in each part of the cell cycle in various parts of the sedimentation profile can all be calculated from the known properties of the cell cycle and the theoretical model of how the separation process works. Experiments were performed in which a synchronous exponentially growing mouse L cells were sedimented using the apparatus and method herein described and all of the above measurements were made on the fractions obtained. The results were in close agreement with the theoretical predictions.

The present invention will be further illustrated by way of the accompanying drawings in which:

FIG. 1 is a diagrammatic representation of the apparatus according to the present invention;

FIG. 2 is a detail of the sedimentation vessel of FIG. 1; and

FIGS. 3, 4, 5 and 6 illustrate diagrammatically the various positions of the sedimentation vessel of FIGS. 1 and 2 in the separation process according to one embodiment of the present invention.

Referring firstly to FIG. 2, the sedimentation vessel comprises a cylindrical vessel 1 which is transparent and formed from lucite, which vessel 1 is mounted in a frame 2 on a horizontal axis 3 diametrically about the side wall 4 thereof for smooth rotation between a horizontal sedimentation position and tilted loading and unloading position. The vessel 1 has a conduit 5 disposed at an acute angle with respect to the side wall 4 such that the liquid passing therethrough would dissipate any kinetic energy against the flat top wall 6 (FIG. 1) of the vessel 1. Similarly, vessel 1 has a conduit 7 disposed at an acute angle to the side wall 4 such that liquid passing therethrough will dissipate any kinetic energy against the flat bottom wall 8 of the vessel 1.

Referring now to FIG. 1, the vessel 1 is shown connected to the sources of the first and second liquid gradient media and the cell sample, which source have only been shown in diagrammatic form as they are known pieces of apparatus as will be seen from the article of Miller et al. and Peterson et al. referred to heretofore.

The source of the first liquid medium comprises a gradient maker 10 which is connected via conduit 11 and three-way valve 12 to the lower conduit 7. The three-way valve 12 is also capable of connecting the conduit 7 to the discharge outlet 13.

The source of the second liquid medium comprises a gradient maker 14 and the source of the cell sample comprises a sample vessel 15 which sources are connected via the conduit 16 to the upper conduit 5 of the vessel 1.

In operation as set forth in FIGS. 3, 4, 5 and 6 the vessel 1 is in its tilted loaded position and is filled completely with the first liquid gradient medium 20 from gradient maker 10 (FIG. 3). In the gradient maker 10 the phosphate buffered saline solution in the second vessel of the gradient maker 10 contains a higher concentration of gradient producing compound, for example fetal calf serum, than the phosphate buffered saline solution in the first vessel and is metered into the first vessel at a rate sufficient to produce the desired gradient in the vessel 1.

After filling the vessel, a known quantity of sample 21 is passed through the conduit 5 to the vessel 1 with an equal quantity of the first liquid medium 20 being withdrawn from the conduit 7 via the discharge outlet 13 (FIG. 4). The vessel 1 is then rotated to a horizontal sedimentation position whence the sample 21 forms a uniform even layer on the surface of the first liquid medium 20 (FIG. 5). It is sometimes advantageous to introduce a small amount of gradient from gradient maker 14 over the cell sample before rotating the vessel 1 to the horizontal position.

When the separation of the cells in the liquid medium is complete the vessel 1 is once more rotated about its horizontal axis to an unloading position and a second liquid gradient medium 22 is passed from gradient maker 14 via the conduit 5 to the vessel and first liquid gradient medium is withdrawn at the same rate through the conduit 7 and the discharge outlet 13 (FIG. 6). The gradient maker 14 operates in a similar manner to the gradient maker 10. As the layers of the first liquid medium which contain the separated cells exits from the vessel 1 through the conduit 7 and the outlet 13, they are collected in separate vessels.

I claim:

1. In a process for the separation of biological cells in a sample thereof in which said cells are suspended in isotonic saline solution by velocity sedimentation under unit gravity, which process comprises forming in a sedimentation vessel a layer of said sample on the upper surface of a liquid medium, said liquid medium having a maximum density less than the least dense cell of said sample and a density gradient which increases with depth and said liquid medium comprising an isotonic saline solution including a high molecular weight material as density gradient producing material, allowing said cells to separate into layers in said liquid medium primarily based on their size and removing said layers separately from said vessel, the improvement which comprises introducing said liquid gradient medium into the base of a closed sedimentation vessel disposed in a loading position to at least substantially fill said vessel, introducing said sample into the top of said vessel to form a layer on the surface of said liquid medium in said vessel, the surface of said liquid medium in said loading position extending between the side walls of said vessel and the top wall of said vessel, rotating said vessel about a horizontal axis from said loading position to a sedimentation position in which cell layers extend between the side walls of said vessel, allowing the cells of said sample to separate into layers in said liquid medium based primarily on their size, rotating said vessel to an unloading position in which the contours of constant fluid density of said liquid extend between the side walls of said vessel and the top wall of said vessel and introducing a second liquid medium into the top of said vessel while withdrawing liquid medium from the bottom of said vessel at the same rate as the introduction of said second liquid medium and subsequently collecting separated cells from different levels in said first liquid medium exiting from the bottom of said vessel, said second liquid medium having a density gradient which increases with depth and comprising an isotonic saline solution including a high molecular weight material as gradient producing material.

2. A process as claimed in claim 1 in which the length of the vessel is substantially less than the width of the vessel.

3. A process as claimed in claim 2 in which the vessel is a generally cylindrical vessel.

4. A process as claimed in claim 3 in which the vessel is a hollow cylinder having parallel flat end walls.

5. A process as claimed in claim 4 in which the vessel is transparent.

6. A process as claimed in claim 5 in which the first liquid medium is introduced in said vessel to completely fill said vessel and the sample is introduced into the top of said vessel, an equal volume of said first liquid medium being withdrawn from the base of said vessel.

7. A process as claimed in claim 6 in which the loading and unloading position of said vessel are the same.

8. A process as claimed in claim 7 in which the first liquid medium is a phosphate buffered saline solution containing a gradient producing agent selected from the group consisting of a serum protein mixture and a serum albumen.

9. A process as claimed in claim 8 in which the first liquid medium is a phosphate buffered saline solution containing gradient producing agent selected from the group consisting of bovine serum albumen and fetal calf serum, said medium having a maximum density of less than about 1.01 gm/cm$^3$.

10. A process as claimed in claim 9 in which the first liquid medium is a phosphate buffered saline solution containing fetal calf serum having a linear gradient of 15 to 30 percent fetal calf serum.

11. A process as claimed in claim 10 in which the second liquid medium is a phosphate buffered saline solution containing fetal calf serum having a linear gradient of 5 to 0 percent fetal calf serum.

12. A process as claimed in claim 4 in which the first and second liquid media are phosphate buffered saline solutions having a linear density gradient in the range 1.004 to 1.006 and containing bovine serum albumen in a linear gradient of 0.5 to 2 percent.

13. A process as claimed in claim 11 in which the sample comprises said living cells suspended in a phosphate buffered saline solution containing 10 percent of fetal calf serum.

14. An apparatus for use in separation of biological cell suspensions, by velocity sedimentation under unit gravity in a liquid medium, which apparatus comprises a frame, a closed vessel having a cylindrical side wall and flat, parallel top and bottom end walls mounted on bearing means in said frame for rotation about a single horizontal axis extending through said cylindrical side wall between a sedimentation position in which the contours of constant fluid density in a liquid medium substantially filling said vessel extend between the cylindrical side wall of said vessel and a loading and unloading position in which contours of constant fluid density extend between the cylindrical side wall and the top end wall of said vessel, the height of the cylinder being substantially less than the diameter of the cylinder, said vessel having opening means in said cylindrical side wall adjacent both the top end wall thereof for the introduction of liquids into said vessel and the bottom end wall thereof for the introduction and removal of liquids from said vessel, said opening means comprising conduits extending from opposite sides of said cylindrical wall at an obtuse angle to the top and bottom end walls for dissipating kinetic energy possessed by said liquid introduced into said vessel on said top and bottom end walls.

15. An apparatus as claimed in claim 14 in which the vessel is transparent.

16. An apparatus as claimed in claim 14 including a first container means for forming in said vessel a liquid gradient medium having a density gradient, a discharge outlet for discharging therethrough one of liquid medium and separated cells, said conduit adjacent said bottom end wall of the closed vessel being connected to a conduit through which said vessel is placed in communication with one of said first container means and said discharge outlet; a second container means for forming in said vessel a liquid medium having a density gradient and a source of the suspension of biological cells to be separated, the conduit adjacent the top end wall of said closed vessel being connected to a conduit through which the vessel is placed in communication with one of said second container means and said source of biological cells.

* * * * *